(No Model.)   7 Sheets—Sheet 1.

C. A. DIXON.
RELEASING VALVE GEAR.

No. 381,001.   Patented Apr. 10, 1888.

Witnesses:
Jas. C. Hutchinson
Henry C. Hazard

Inventor.
C. A. Dixon.
by Prindle and Russell
his attorneys (No Model.)

C. A. DIXON.
RELEASING VALVE GEAR.

No. 381,001.

7 Sheets—Sheet 2.

Patented Apr. 10, 1888.

(No Model.)

C. A. DIXON.
RELEASING VALVE GEAR.

No. 381,001.

7 Sheets—Sheet 4.

Patented Apr. 10, 1888.

Witnesses:
Jas. E. Hutchinson.
Henry C. Hazard.

Inventor.
C. A. Dixon.
by Prindle and Russell
his Attorneys (No Model.)
7 Sheets—Sheet 5.

C. A. DIXON.
RELEASING VALVE GEAR.

No. 381,001. Patented Apr. 10, 1888.

(No Model.) 7 Sheets—Sheet 6.

C. A. DIXON.
RELEASING VALVE GEAR.

No. 381,001. Patented Apr. 10, 1888.

Witnesses:
Jas. E. Hutchinson.
Henry C. Hazard.

Inventor.
C. A. Dixon.
by Kindle & Russell
his attorneys.

(No Model.) 7 Sheets—Sheet 7.

C. A. DIXON.
RELEASING VALVE GEAR.

No. 381,001. Patented Apr. 10, 1888.

UNITED STATES PATENT OFFICE.

CHARLES A. DIXON, OF NEWBURG, NEW YORK, ASSIGNOR TO ROBERT WHITEHILL, OF SAME PLACE.

RELEASING VALVE-GEAR.

SPECIFICATION forming part of Letters Patent No. 381,001, dated April 10, 1888.

Application filed October 4, 1887. Serial No. 251,458. (No model.)

*To all whom it may concern:*

Be it known that I, CHARLES A. DIXON, of Newburg, in the county of Orange, and in the State of New York, have invented certain new and useful Improvements in Releasing Valve-Gears; and I do hereby declare that the following is a full, clear, and exact description thereof, reference being had to the accompanying drawings, in which—

Figure 1:
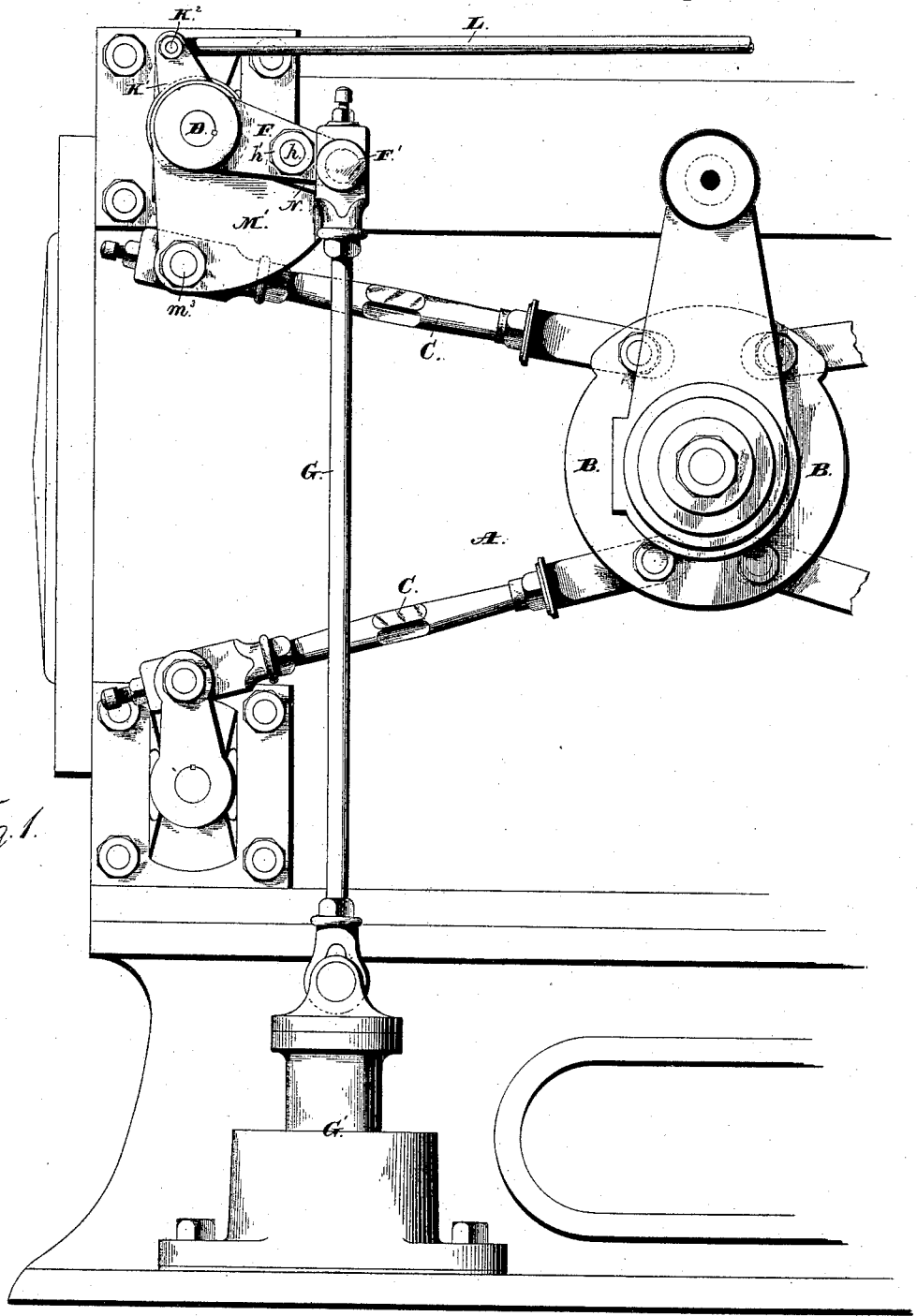
Figure 2:
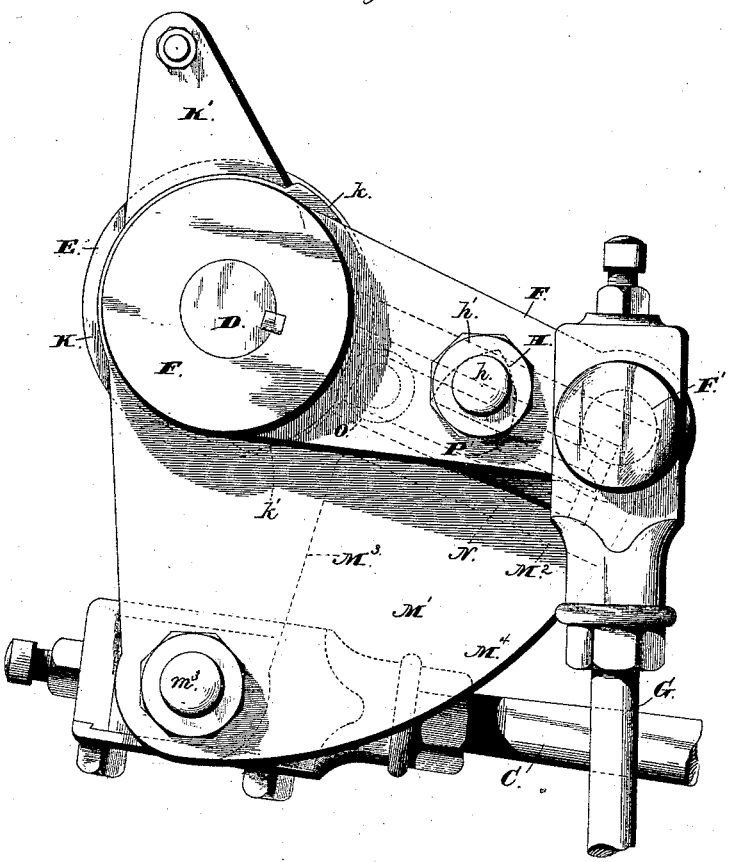
Figure 3:
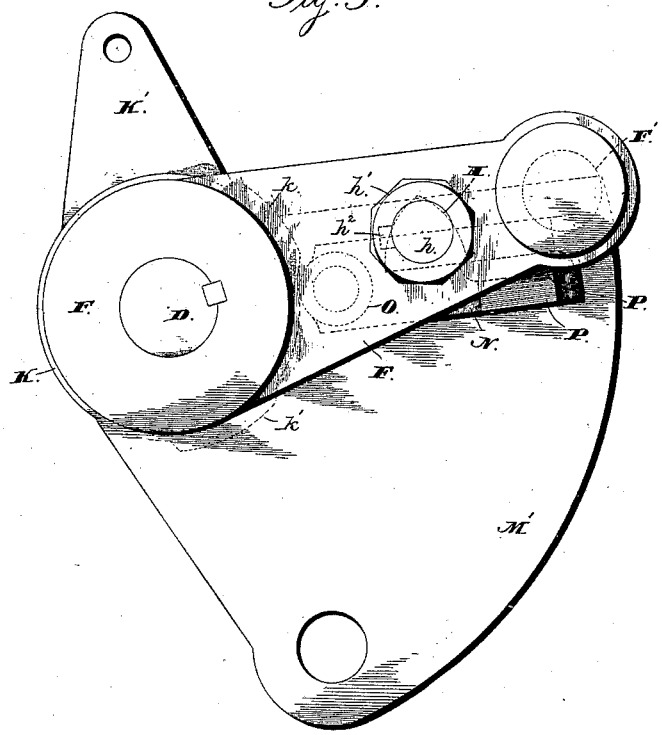
Figure 4:
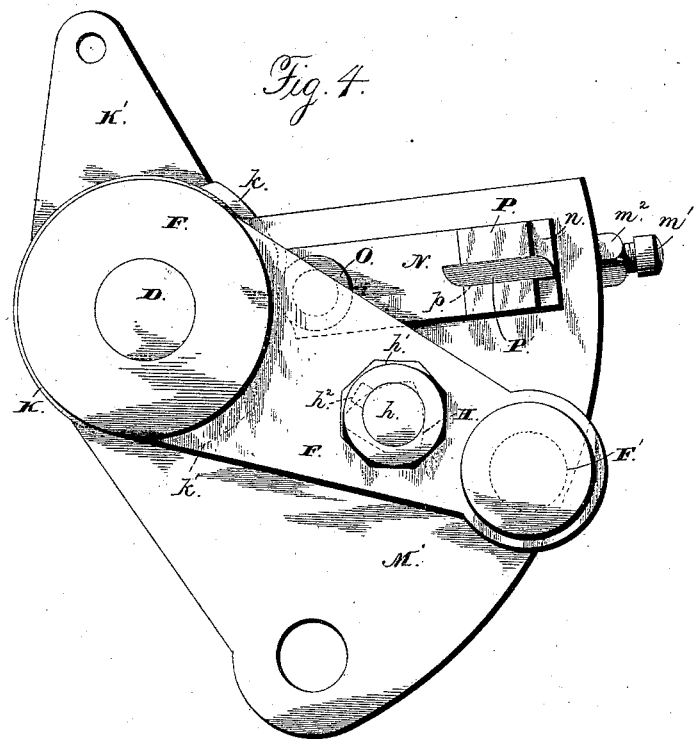
Figure 5:
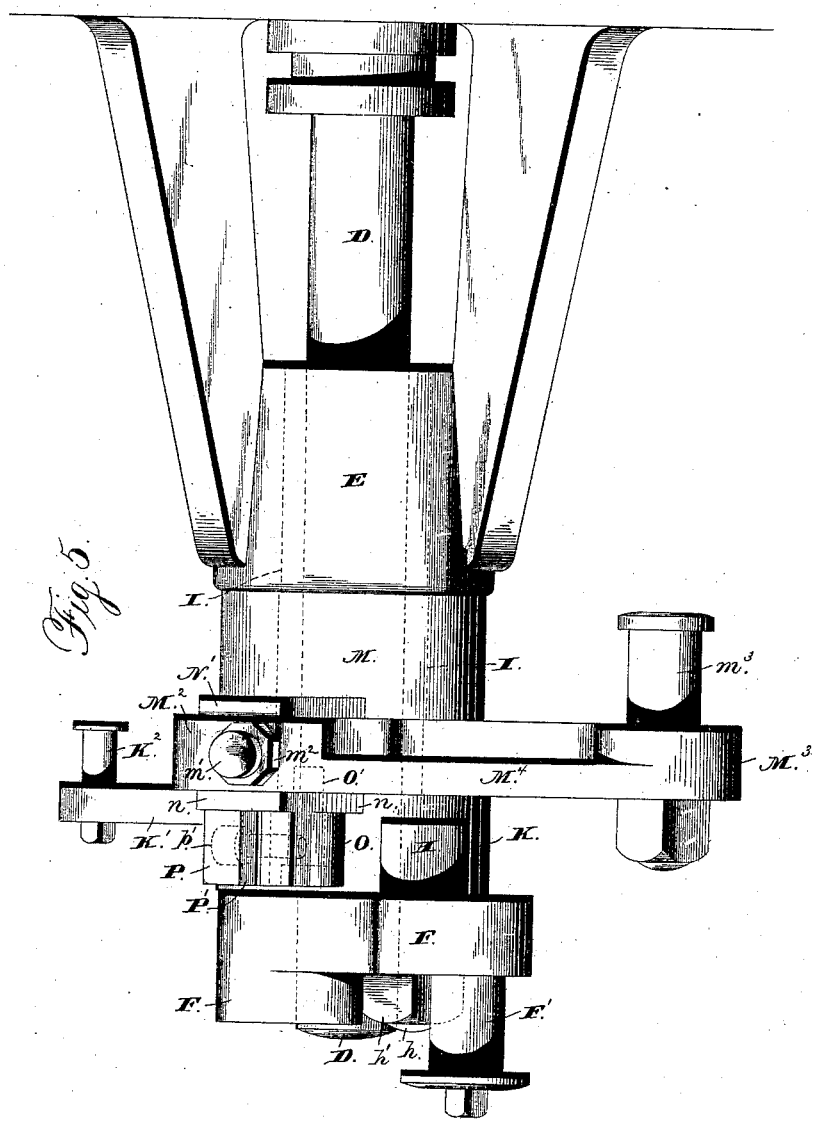
Figure 6:
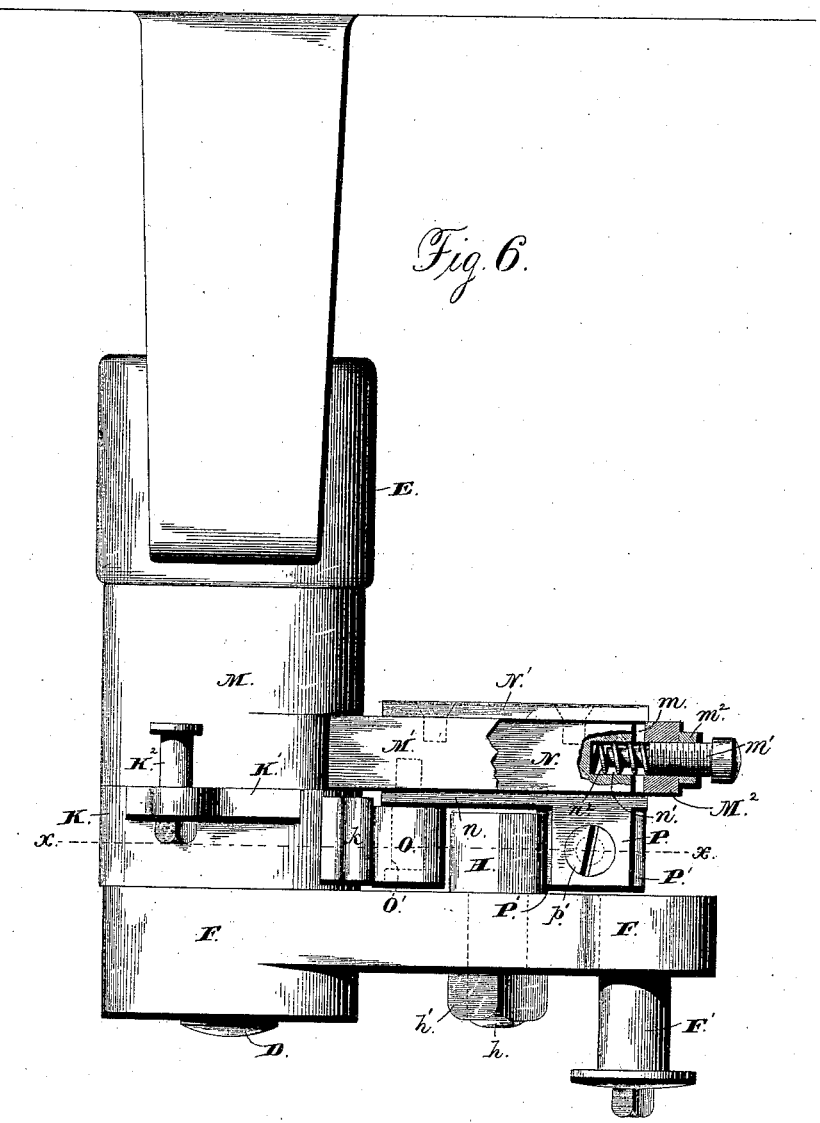
Figure 7:
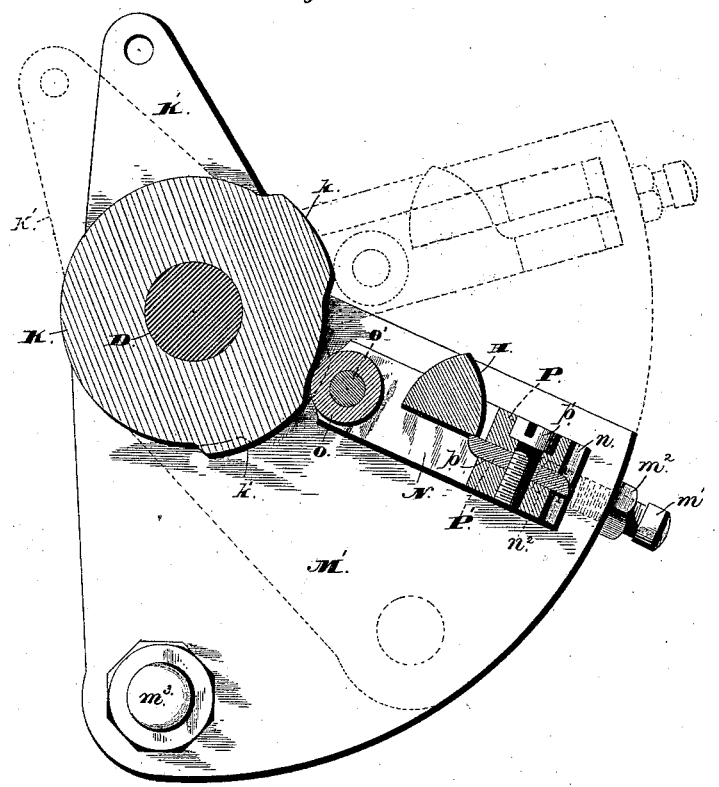
Figure 8:
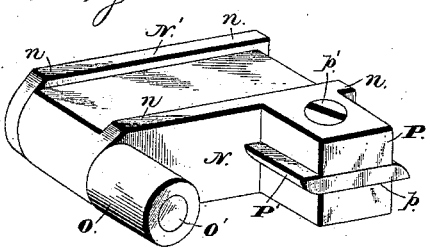

Figure 1 shows a view in side elevation of a portion of a cylinder with my releasing valve-gear in place thereon; Fig. 2, a similar view of my gear in position as when the valve is just to be opened; Fig. 3, a similar view of the gear in position as when the valve has been fully opened; Fig. 4, a similar view of the gear after the valve crank-arm has been released; Fig. 5, a view of the valve-gear in end elevation; Fig. 6, a plan view of the gear with parts in section to show the construction clearly; Fig. 7, a vertical section on line $x\ x$ of Fig. 6; Fig. 8, a detail perspective view of the sliding catch-block.

Letters of like name and kind refer to like parts in each of the figures.

The object of my invention is to provide an improved releasing valve-gear; and to this end my invention consists in the gear and in the construction, arrangement, and combination of the parts thereof, as hereinafter specified.

In the drawings, A designates the cylinder, to which my gear is applied.

As my invention has nothing to do with any particular construction of the valves themselves, I have not shown the valves in the drawings. As would be indicated, however, by the construction of the valve-gear, they are preferably of the rotary kind, substantially such as are used in the well-known type of Corliss engine.

B designates the rocking plate or wrist-plate, which is actuated by the eccentric-rod in the usual way, and from which the valves are usually operated by suitable connections with links or rods C C, pivoted to the plate.

In the drawings I have shown one of the links C connected with my valve-gear and one with the outlet or exhaust valve below.

The valve-stem of the inlet-valve, to which I have shown my gear as applied, is designated by the letter D. It extends outward through a fixed hub or tubular projection, E, and on its outer end carries the crank-arm F fixed upon it. This crank-arm has the crank-pin F' at its outer end, upon which pin is pivoted the upper end of the drop-rod G, which at its lower end is connected with the dash-pot G' in the ordinary way, so that when the rod has been raised the action of the dash-pot is to draw it quickly down again to return it to its lowest position. The dash-pot and the connection of the rod G therewith can be of any of the well-known constructions.

I do not limit myself to any particular form of dash-pot or to any dash-pot at all, as other means for returning the rod to its lowest position when it has been raised can be employed.

On the inner side of the crank-arm F, between crank or wrist pin F' and the valve rock shaft or stem D, is the triangular bearing-block H, preferably of steel. Two of its sides are rounded, while the third (the lower side) is made substantially straight. The block is situated on the crank-arm on a radial line from the axis of the valve-stem to the crank-pin F'. This arrangement of course brings the lower straight side of the block below such radial line; but such side is made to extend in another radial line from the valve-stem axis or the center of motion of the crank F by setting the block as shown in the drawings. Said block is fastened in place as adjusted on the crank-arm by a stem, $h$, extending through the arm and threaded on its outer end, and the nut $h'$ screwed on the stem up against the outer side of the arm. This construction enables the bearing-block to be adjusted or removed and replaced as desired.

Surrounding the valve-stem D and fixed at its inner end within the tubular part E of the valve-bonnet is the bushing I, upon which, close to the inner side of the crank arm F, is journaled the cam-carrying collar K, provided with the two cams $k$ and $k'$, to be described more specifically hereinafter. This collar has the arm K' projecting upwardly, and on the arm is the pin K², to which is connected the end of the governor-rod L, to be actuated in the usual way by the governor (not shown) as the load on the engine increases or diminishes. Journaled on the bushing between the collar K and the outer end of the valve-bonnet is the hub M of the elbow or double lever M'. This lever has the two arms M² M³ preferably connected together by the web or plate M⁴, though such construction is not necessary. The upper arm, M², of the lever is slotted longitudinally, as shown, and in the slot $m$ is the sliding block N, guided in its movements along the slot by ribs or flanges $n$ $n$, engaging the sides of the arm. In order to facilitate the putting in place and removal of the sliding block, the flanges or ribs are fixed to the block only on one side thereof, and on the other side is a removable plate, N', forming with its projecting upper and lower edges guiding-ribs on the block to engage the lever arm sides.

Upon the outer side of the sliding block, close to the outer periphery of the collar K, so as to be in position to be engaged by the cams $k$ and $k'$ on the latter, as hereinafter described, is the roller O, journaled upon the screw-stud O'. On the same side of the block with roller O, but at or near the outer end thereof, is the block or piece P, slotted longitudinally with reference to block N, so as to receive the catch-plate P', preferably made of steel. Such plate is held in place in the slot $p$ in block P by means of the screw $p'$, passing through the plate and tapped into the block. Its edge toward the valve-stem is, as shown, beveled upward and inward with a slightly-rounded or convex bevel, while its outer edge is correspondingly beveled in the opposite direction—that is, downward and outward. With this construction the plate can, if the inner beveled edge becomes worn, be turned over, so as to bring the other beveled edge into proper position on the side of block P toward the valve-stem to take the place of the worn edge. In the outer end of sliding block N is the recess $n'$, in which is the spring $n^2$ for throwing the block inward toward the valve-stem to bring the roller O against the periphery of the cam-carrying collar K. The outer end of the spring $n^2$ projects into a recess, $m$, in the lever-arm M² and is engaged by the end of an adjusting-screw, $m'$, which is provided with a locking-nut, $m^2$.

The lower arm, M³, of the double or elbow lever M' is provided with a crank-pin, $m^3$, to which is connected the end of link or connecting rod C, actuated by suitable connections with the rocking disk or wrist-plate B. Such wrist-plate is, as indicated hereinbefore, such a one as is used in the well-known form of Corliss engine for operating the valves, and which itself is actuated with a forward-and-back rotary motion by the eccentric-rod of the engine.

The catch-plate P' on the sliding spring-pressed block N on arm M² is so situated as to engage with its beveled edge the outer inclined side of bearing piece or block P on the valve-stem crank when the arm M² is swung down by the action of the rod C in forcing the lever-arm M³ outward. As the plate-edge rides down over the inclined side of the bearing-piece, the plate and block P are forced outward against the stress of spring $n^2$, and when the plate passes down off of such side of the bearing-piece the spring acts to throw the block quickly inward again to bring the edge of the catch-plate under the edge of the straight lower side of said piece. As the rod C moves inward again to swing arm M² of the lever upward, the valve-stem crank will then, on account of the engagement of the catch-plate with the bearing-piece on the crank, be carried upward also to rock the valve-stem and open the valve. The distance to which the valve-stem crank will move with the lever-arm M², and so the opening of the valve, is obviously determined by the amount of the swing of the lever, during which the catch-plate remains in engagement with the bearing-piece P.

To disengage the plate at any desired point of the swing of the lever-arm M², the collar K is provided with the cam $k$, already described hereinbefore, which, as the said arm swings upward, is engaged by roller O and causes the same, with sliding block N and catch-plate P', to be moved bodily outward. The bearing-piece P being thus released from the catch-plate, the valve-stem crank-arm is free to fall and is drawn quickly down, so as to close the valve, by means of the drop-rod G and dash-pot G'.

The point at which cam $k$ will engage the roller O is regulated by the adjustment of the collar K around the bushing I, and such adjustment is automatically made by the swinging of the collar-arm K' by the governor-rod, so that as the load on the engine increases or diminishes the cam will be in position to be engaged by roller O when the arm M² and valve-crank F have moved upward together a shorter or longer distance. The opening of the valve is thus determined by the position of cam $k$, which in turn is determined and adjusted by the governor according to the load on the engine. The other cam, $k'$, on the collar K is so situated thereon that if the governor band or belt should break and the governor should consequently fall to its lowest limit said cam would, by the swinging of arm K' and the collar K, be brought, as shown by dotted lines in Fig. 7, into position to engage the roller O and force it and the catch-plate outward at the lowest point of the swing of arm M². The catch-plate cannot then catch under the bearing-piece P and the valve-stem crank cannot be raised by any motion of arm M², but will remain down, so as to close the valve and stop the engine.

The gear for the other inlet-valve (not shown) is to be precisely like that described and shown, except that it will be on the opposite side of the valve-stem—that is, the valve-stem crank-arm will project inward on the side toward the other valve. With this construction, when a bearing-piece on one of the crank-arms becomes worn at the edge engaged by the respective catch-plate, the pieces on the two arms can be changed one for the other and new and unworn edges be thus presented for engagement with the catch-plates.

In Fig. 6 I have shown the screw $m'$ as provided with an inwardly-projecting portion, $m^4$, of reduced size extending into and adapted to act as a guide for or steady the spiral spring; but such construction I do not regard as necessary.

As indicated in dotted lines in Fig. 3, the sleeve $h$ of the bearing-block H can be provided with a spline or feather, $h^2$, engaging a suitably-shaped way or notch at the side of the stem-receiving opening in the valve crank-arm.

Having thus described my invention, what I claim is—

1. In combination with the lever and the spring-actuated catch thereon, the valve-operating crank provided with a projection having an inclined face over which the catch rides and which forces the latch outward as the lever swings in one direction, and an abrupt face to be engaged by the catch as the lever swings in the other direction, and a cam to operate the catch to release the projection on the valve-crank, substantially as and for the purpose specified.

2. In combination with the lever having the spring-actuated catch with the beveled face, the valve-crank provided with a projection having an inclined face and an abrupt face to engage the catch on the lever as the lever swings in one direction and the other, and a movable cam for actuating the catch to release the projection on the crank-arm, and suitable connections whereby the position of the cam can be adjusted from the governor of the engine, substantially as and for the purpose set forth.

3. In combination with the valve crank-arm having a lug or bearing-piece, the lever, the sliding block thereon carrying a catch-plate to engage the lug on the crank-arm, the spring actuating the block, a cam carried on an adjustable piece, and a roller on the sliding block adapted to be engaged by the cam, substantially as and for the purpose shown.

4. In combination with the valve crank-arm provided with a bearing-piece, the swinging lever, the sliding block thereon provided with a roller and with a catch-plate, the spring engaging the block, and a rotary collar carrying a cam, substantially as and for the purpose set forth.

5. In combination with the valve crank-arm and the lever actuated by the valve-operating mechanism, the sliding spring-actuated catch on the lever, an inclined face on the crank-arm to engage and move the latch against the stress of the spring as the lever moves in one direction, a shoulder on the crank-arm to be engaged by the catch as the lever moves in the other direction, the cam-collar carrying a cam to operate the spring-catch to disconnect the lever and arm, and means for returning the valve crank-arm into position to close the valve, substantially as and for the purpose described.

6. In combination with the rotary collar adapted to be turned by suitable connections with the governor of an engine, and provided with a cam, the valve crank-arm provided with a lug or bearing-piece, the lever actuated from the valve-operating mechanism, the sliding catch on the lever, the spring engaging the catch, and a roller on the catch adapted to engage the cam, substantially as and for the purpose specified.

7. In combination with the lever actuated from the valve-operating mechanism and the sliding spring-pressed catch on the lever, the valve crank-arm provided with a cam-face to move the catch against the stress of its spring and a shoulder to be engaged by the catch, a collar provided with the two opposite cams, and a suitable projection or arm on the catch for engagement with the cams, so that the latter shall move the catch against the stress of its spring out of position to engage the shoulder on the valve crank-arm, substantially as and for the purpose set forth.

8. In combination with the valve crank-arm provided with the bearing-piece having the rounded outer side, the lever, the sliding spring-pressed block thereon, and a catch-plate carried by the block, substantially as and for the purpose described.

In testimony that I claim the foregoing I have hereunto set my hand this 19th day of September, A. D. 1887.

CHAS. A. DIXON.

Witnesses:
HENRY C. HAZARD,
JAS. E. HUTCHINSON.